United States Patent
Bastide et al.

(10) Patent No.: US 11,928,611 B2
(45) Date of Patent: Mar. 12, 2024

(54) CONVERSATIONAL INTERCHANGE OPTIMIZATION

(71) Applicant: International Business Machines Corporation, Armonk, NY (US)

(72) Inventors: Paul R. Bastide, Ashland, MA (US); Liam S. Harpur, Dublin (IE); Matthew E. Broomhall, Goffstown, NH (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 16/686,248

(22) Filed: Nov. 18, 2019

(65) Prior Publication Data

US 2021/0150398 A1    May 20, 2021

(51) Int. Cl.
| | |
|---|---|
| *G06N 20/00* | (2019.01) |
| *G06F 17/18* | (2006.01) |
| *G06F 40/30* | (2020.01) |
| *G06N 7/00* | (2023.01) |
| *G06N 7/01* | (2023.01) |
| *G10L 15/18* | (2013.01) |
| *G10L 15/22* | (2006.01) |

(52) U.S. Cl.
CPC .............. *G06N 7/01* (2023.01); *G06F 17/18* (2013.01); *G06F 40/30* (2020.01); *G06N 7/00* (2013.01); *G06N 20/00* (2019.01); *G10L 15/1815* (2013.01); *G10L 15/22* (2013.01)

(58) Field of Classification Search
CPC .......... G06N 7/005; G06N 7/00; G06N 20/00; G06N 3/084; G06N 7/01; G06F 17/18; G06F 40/30; G10L 15/1815; G10L 15/22
See application file for complete search history.

(56) References Cited

U.S. PATENT DOCUMENTS

| | | | |
|---|---|---|---|
| 11,557,311 B2 * | 1/2023 | Ando | G06F 40/20 |
| 2006/0256937 A1 * | 11/2006 | Foreman | G06Q 10/00 |
| | | | 379/88.08 |

(Continued)

FOREIGN PATENT DOCUMENTS

WO    2017200074 A1    11/2017

OTHER PUBLICATIONS

J2KUN, "Markov Chain Monte Carlo Without All The Bullshit", Math Programming, Apr. 6, 2015, 16 pages, <https://ieremykun.com/2015/04/06/markov-chain-monte-carlo-without-all-the-bullshit/>.

(Continued)

*Primary Examiner* — Michael Simitoski
*Assistant Examiner* — Hany S. Gadalla
(74) *Attorney, Agent, or Firm* — Edward J. Wixted, III

(57) ABSTRACT

In an approach for conversational interchange optimization, a processor monitors conversations in a communication system. A processor generates a list of topics in the conversations. A processor determines a flow for each topic based on length of time, number of participants, and sentiment associated to each topic. The flow is the progress of interactions and shifts for each topic. A processor builds a statistical model for each topic based on the flow to predict success or failure of a topic progression for an incoming conversation. A processor updates the topic progression for the incoming conversation based on the predicted success or failure.

20 Claims, 6 Drawing Sheets

(56) References Cited

U.S. PATENT DOCUMENTS

| | | | | |
|---|---|---|---|---|
| 2009/0220064 | A1* | 9/2009 | Gorti | H04M 3/568 |
| | | | | 379/202.01 |
| 2011/0010637 | A1* | 1/2011 | Schneider | G06Q 10/107 |
| | | | | 715/752 |
| 2012/0115449 | A1* | 5/2012 | Bruchelt | H04M 1/575 |
| | | | | 455/415 |
| 2014/0129331 | A1* | 5/2014 | Spivack | G06Q 30/0255 |
| | | | | 705/14.53 |
| 2015/0025931 | A1* | 1/2015 | Li | G06Q 10/0633 |
| | | | | 705/7.27 |
| 2015/0172227 | A1 | 6/2015 | Grove, II | |
| 2015/0195406 | A1* | 7/2015 | Dwyer | H04M 3/5191 |
| | | | | 379/265.07 |
| 2016/0112567 | A1 | 4/2016 | Matula et al. | |
| 2016/0294836 | A1* | 10/2016 | Williams | H04L 63/0421 |
| 2018/0122383 | A1* | 5/2018 | Raanani | H04M 3/5175 |
| 2018/0137121 | A1* | 5/2018 | Agarwal | G06F 16/437 |
| 2018/0152558 | A1* | 5/2018 | Chan | H04W 4/16 |
| 2019/0197361 | A1* | 6/2019 | Rajendran | G06N 20/00 |
| 2020/0125928 | A1* | 4/2020 | Doyle | G06N 3/0472 |
| 2020/0152178 | A1* | 5/2020 | Ando | G10L 15/22 |
| 2020/0152184 | A1* | 5/2020 | Steedman Henderson | |
| | | | | G10L 15/1822 |
| 2021/0314440 | A1* | 10/2021 | Matias | H04M 3/42136 |

OTHER PUBLICATIONS

Whitbourne, Dr. Susan Krauss, "10 Must-Know Tips For Making Better Conversations", Psychology Today, Dec. 19, 2017, <https://www.psychologytoday.com/intl/blog/fulfillment-any-age/201712/10-must-know-tips- making-better-conversations>.

Mell et al., "The NIST Definition of Cloud Computing", Recommendations of the National Institute of Standards and Technology, Special Publication 800-145, Sep. 2011, 7 pages.

* cited by examiner

CONVERSATIONAL INTERCHANGE OPTIMIZATION

BACKGROUND

This disclosure relates to communication systems, and more particularly, to conversational interchange optimization over a communication system.

Various communication and collaboration platforms enable multiple individuals to interact with one another for a variety of purposes. Such platforms can provide, for example, enterprise-wide instant messaging, web conferencing, community collaboration, telephony integration, text messaging, cognitive computing capabilities, and various other services. Individuals can use such platforms to engage in conversations, whether verbal or written, in real time.

SUMMARY

Aspects of an embodiment of the present disclosure disclose an approach for conversational interchange optimization. A processor monitors conversations in a communication system. A processor generates a list of topics in the conversations. A processor determines a flow for each topic based on length of time, number of participants, and sentiment associated to each topic. The flow is the progress of interactions and shifts for each topic. A processor builds a statistical model for each topic based on the flow to predict success or failure of a topic progression for an incoming conversation. A processor updates the topic progression for the incoming conversation based on the predicted success or failure.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
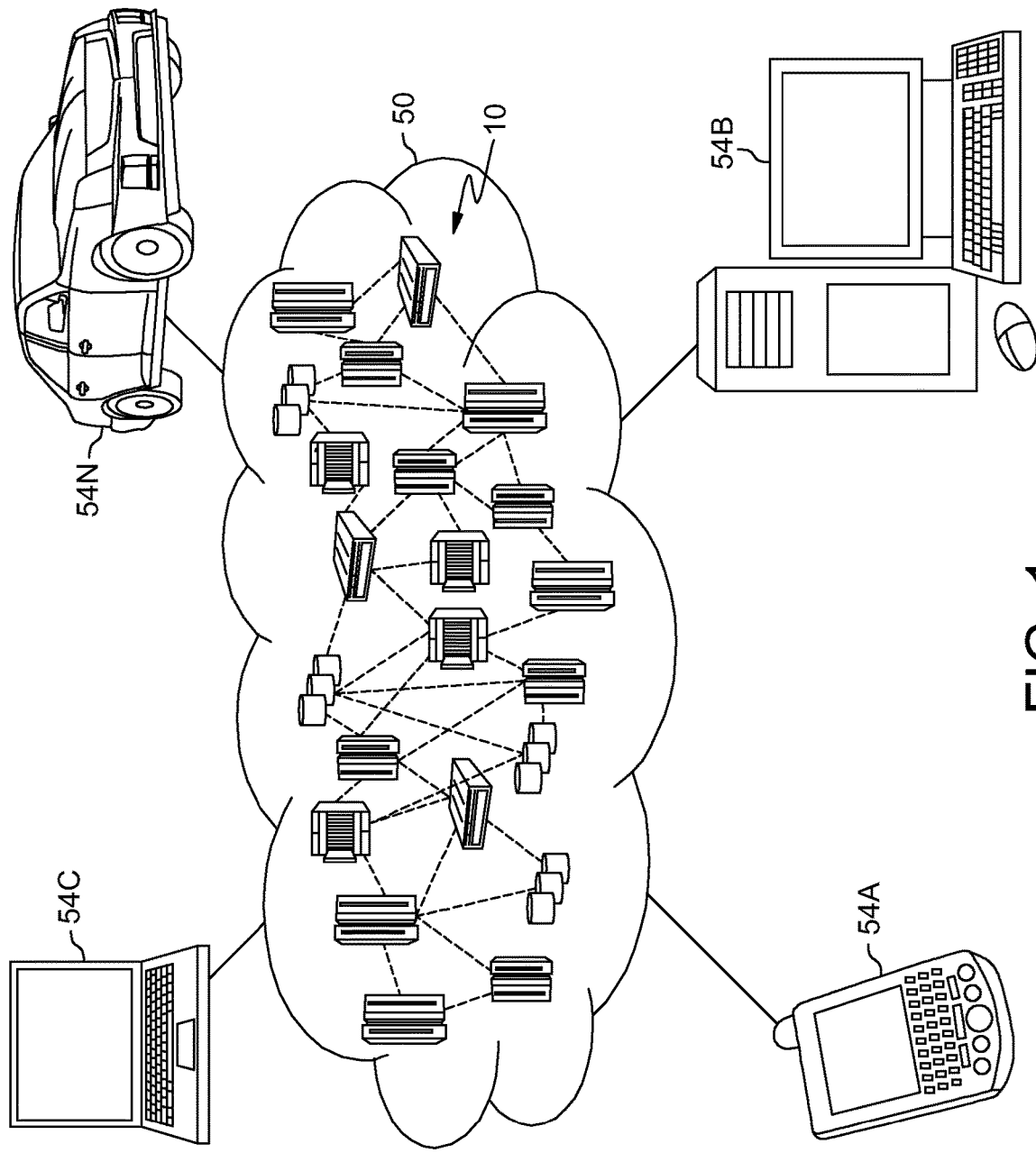
FIG. 1 depicts a cloud computing environment according to an embodiment of the present disclosure.

While this disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The disclosure relates to communication systems, and more particularly, to conversational interchange optimization over a communication system. The present disclosure directs to methods, systems, and computer program products that determine and execute an optimal topic map navigation with an associated length of time for each topic to prevent the topic from approaching a threshold risk of sentiment shift. When multiple topic flows are ascertained that encompass the required topics, in real time the interaction drops, or adds, the topic from a conversation, and shifts to a different topic to keep participants interested and with an overall satisfaction. Depending on users and topics, the methods, systems, and computer program products change the length of time that a proposed interaction should focus on a topic, e.g. in a meeting, instant message chat or post interaction. The methods, systems, and computer program products determine if a topic requires a certain level of interaction activity. The methods, systems, and computer program products are optionally able to present a visual map which clearly identifies what interactions are needed and what are the expected results of interactions.

The present disclosure discloses analyzing topic activities in conversations. Interaction engagement outcome data of users may be analyzed. For example, a flow of topic progression that involves a topic type may be ascertained using prioritized objectives for time, cost, and sentiment. A probability model may be derived for a specific topic type. The probability model may be used in a simulation to predict a long run success or failure of future topic progressions. The predicted long run success or failure may be used to motivate changes in cadence and intensity in collaboration platforms. The present disclosure may topologically sort the map based on out-degree and in-degree of topics. The present disclosure may back track to prior conversations to connect to out-degree topics to see which ones are strongly connected to prior conversations.

The present disclosure may store a prior conversational map in order to minimally restart a conversation. The present disclosure may also use a proxy for a conversation map. The present disclosure may join two distinct maps (or graphs) into a joined map (or subgraph). The sentiment shift may be a shift in non-textual indicators (e.g., pause length) or increased affectations (e.g., um, ah) or increased usage of emoticons. The flow of shift can be measured to determine weight of the specific indicators. For example, low weight to the phrase "So, as I was saying" where its meaning indicates a short pause, yet no follow up term to indicate a quick shift to another topic. As opposed to the phrase "So, anyways . . . as I was saying" which would indicate a strong sentiment to get the conversation on track. Using this weight the system may determine how significant the awkward pauses are with respect to each other and can choose to react if needed. The present disclosure may reassess the conversation interchanges relative to the shared baseline between the users. If the shared baseline is high, the time of expected interchange is accelerated, and the converse is also true.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
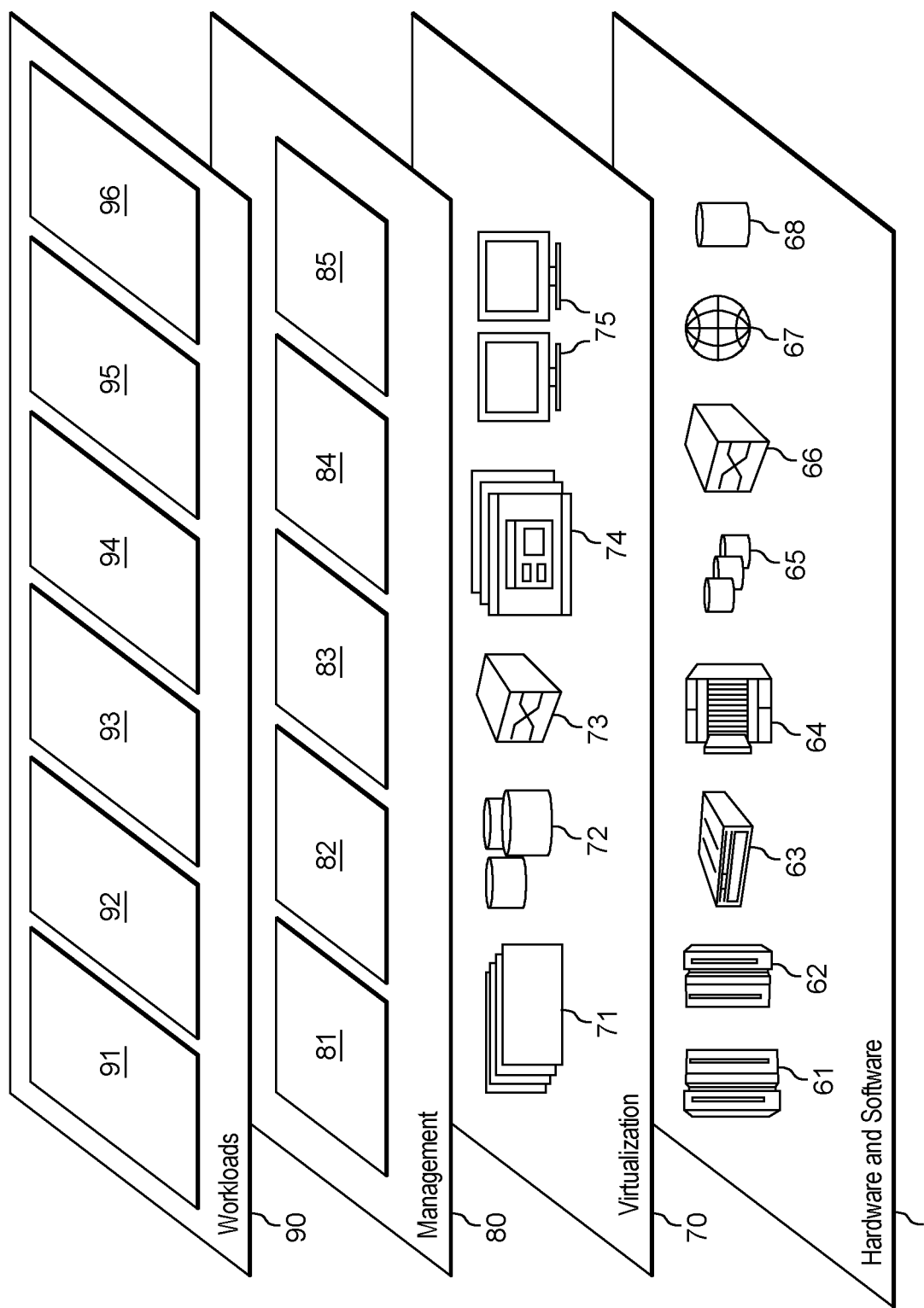
FIG. 2 depicts abstraction model layers according to an embodiment of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and conversational interchange optimization 96.

In one or more embodiments, system for conversational interchange optimization 96 is capable of optimizing a topic progression within a conversation. A "conversation," as defined herein, is a verbal interaction or written exchange of words between two or more participants. The system can identify phrases in a textual rendering (the "text") of a conversation. As defined herein, a "phrase" is a word or intelligible sequence of words, whether in the form of grammatical clause, sentence or series of sentences. According to one embodiment, the system is trained using machine learning to recognize topics of conversations and to classify phrases within the conversations according to specific topics. As defined herein, a "topic" is a subject of, or a matter dealt with in, a conversation. A conversational change or shift includes, for example, moving from one phase of a conversation to another and/or switching topics. An example of a conversational change or shift includes moving from an introduction to a topic-specific discussion. A conversational change or shift includes, for example, moving from one topic to another topic. A conversational change or shift, for example, is moving from a topic-specific discussion to a question-and-answer phase in which one or more questions are posed, regardless of whether there is a response, equivocation, or no response to a question. Still another example includes the moving from a question-and-answer phase or topic-specific discussion to a concluding phase.

An introduction can be a general introduction (e.g., naming and/or welcoming participants) or topic-specific introduction (e.g., describing a topic and/or defining topical terms). A topic-specific discussion includes a series of statements, at least some of which relate to a set of one or more common concepts. Accordingly, some words or phrases may be unrelated or extraneous to the topic, but over a definable time period words or phrases of the conversation relate to one another by pertaining to a topic notwithstanding possible intervening words or phrases. Extraneous words or phrases can comprise brief phases of what is generally referred to as "getting off topic," but nevertheless the conversation returns to the words or phrases that pertain to the topic before a conclusion of the discussion. A concluding phase, for example, can include a summation of the discussion, a proposal or a directive for future discussion, and/or a brief salutation. System for conversational interchange optimization 96 can be trained using machine learning to identify and classify word patterns corresponding to specific phrases indicating various conversation shifts.

System for conversational interchange optimization 96 is capable of monitoring the conversations in a communication system, including, for example, meeting minutes, connection activities, emails, and social media posts. System for conversational interchange optimization 96 is capable of identifying topics associated with the conversations from the communication system and generating a list of the topics associated with the conversations. System for conversational interchange optimization 96 is capable of determining a flow for each topic based on length of time, number of participants, and sentiment associated to each topic in the list of topics of the conversations. System for conversational interchange optimization 96 is capable of building a statistical model for each topic based on the flow to infer likely success of a topic progression for an incoming conversation. The statistical model may be combined with a transition matrix to infer likely success paths for the topic to proceed. The transition matrix is configured to use analysis of, for example, regression analysis, conditional probability, and completion probability. System for conversational interchange optimization 96 is capable of optimizing a topic progression for an incoming conversation based on an inferred success or failure from the statistical model. The system may act to add or remove a participant from the incoming conversation. The system may update a schedule for the incoming conversation. The system may optionally generate a visualized map identifying interactions needed and the expected results of interactions for the incoming conversation. A visual of the analysis is optionally created and surfaced graphically to determine the completion of topics and interactions. Further features of system for conversational interchange optimization 96 are described below in greater detail.

Figure 3:
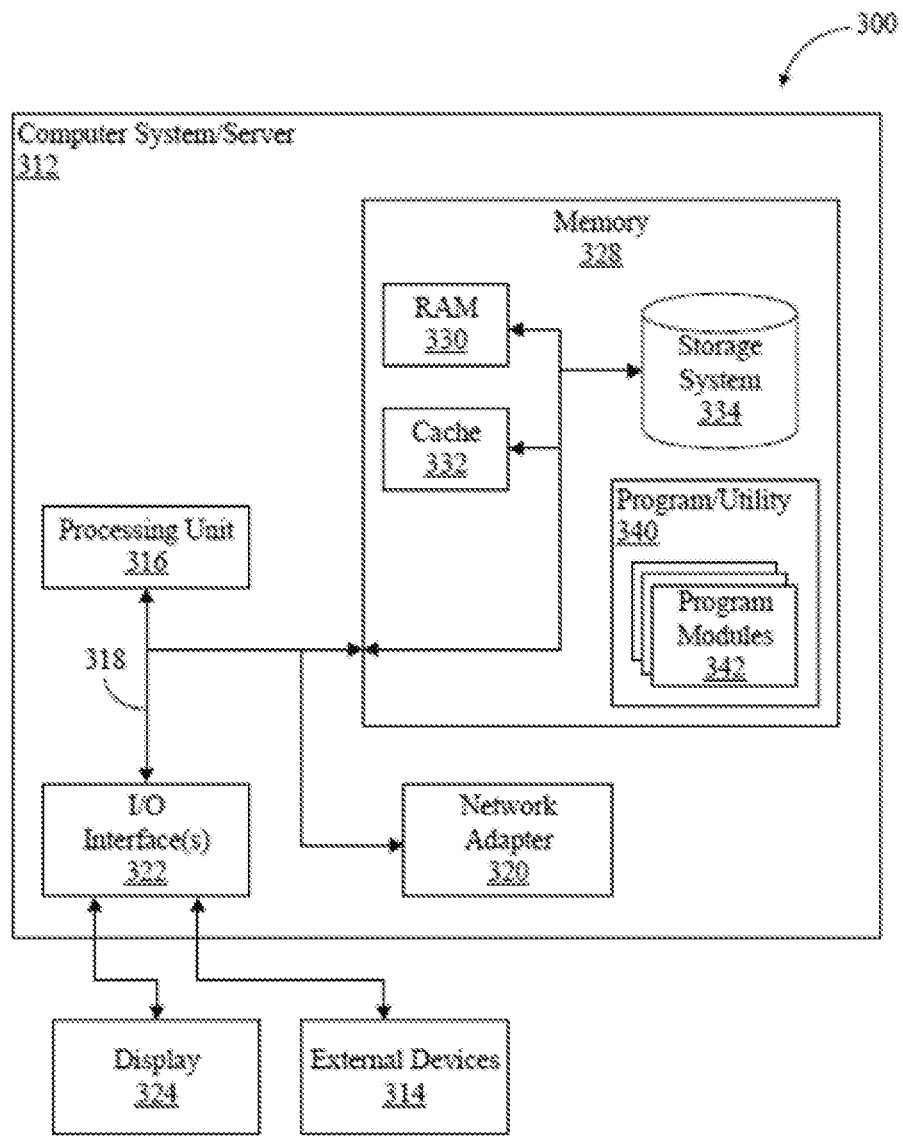
FIG. 3 depicts a cloud computing node according to an embodiment of the present disclosure.

FIG. 3 illustrates a schematic of an example of a computing node 300. In one or more embodiments, computing node 300 is an example of a suitable cloud computing node. Computing node 300 is not intended to suggest any limitation as to the scope of use or functionality of embodiments of the invention described herein. Computing node 300 is capable of performing any of the functionality described within this disclosure.

Computing node 300 includes computer system 312, which is operational with numerous other general-purpose or special-purpose computing system environments or configurations. Examples of well-known computing systems, environments, and/or configurations that may be suitable for use with computer system 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 312 may be described in the general context of computer system-executable instructions, such as program modules, being executed by a computer system. Generally, program modules may include routines, programs, objects, components, logic, data structures, and so on that perform particular tasks or implement particular abstract data types. Computer system 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system 312 is shown in the form of a general-purpose computing device. The components of computer system 312 may include, but are not limited to, one or more processors 316, a memory 328, and a bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 312 typically includes a variety of computer system readable media. Such media may be any available media that is accessible by computer system 312, and may include both volatile and non-volatile media, removable and non-removable media.

Memory 328 may include computer system readable media in the form of volatile memory, such as random-access memory (RAM) 330 and/or cache memory 332. Computer system 312 may further include other removable/non-removable, volatile/non-volatile computer system storage media. By way of example, storage system 334 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein. For example, one or more of the program modules may include system for conversational interchange optimization 96 or portions thereof.

Program/utility 340 is executable by processor 316. Program/utility 340 and any data items used, generated, and/or operated upon by computer system 312 are functional data structures that impart functionality when employed by computer system 312. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 312 may also communicate with one or more external devices 314 such as a keyboard, a pointing device, a display 324, etc.; one or more devices that enable a user to interact with computer system 312; and/or any devices (e.g., network card, modem, etc.) that enable computer system 312 to communicate with one or more other computing devices. Such communication can occur via input/output (I/O) interfaces 322. Still yet, computer system 312 can communicate with one or more networks such as a local area network (LAN), a general wide area network (WAN), and/or a public network (e.g., the Internet) via network adapter 320. As depicted, network adapter 320 communicates with the other components of computer system 312 via bus 318. It should be understood that although not shown, other hardware and/or software components could be used in conjunction with computer system 312. Examples, include, but are not limited to the following: microcode, device drivers, redundant processing units, external disk drive arrays, RAID systems, tape drives, and data archival storage systems, etc.

While computing node 300 is used to illustrate an example of a cloud computing node, it should be appreciated that a computer system using an architecture the same as or similar to that described in connection with FIG. 3 may be used in a non-cloud computing implementation to perform the various operations described herein. In this regard, the example embodiments described herein are not intended to be limited to a cloud computing environment. Computing node 300 is an example of a data processing system. As defined herein, the term "data processing system" means one or more hardware systems configured to process data, each hardware system including at least one processor programmed to initiate operations and memory.

Computing node 300 is an example of computer hardware. Computing node 300 may include fewer components than shown or additional components not illustrated in FIG. 3 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 300 is also an example of a server. As defined herein, the term "server" means a data processing system configured to share services with one or more other data processing systems. As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

Figure 4:
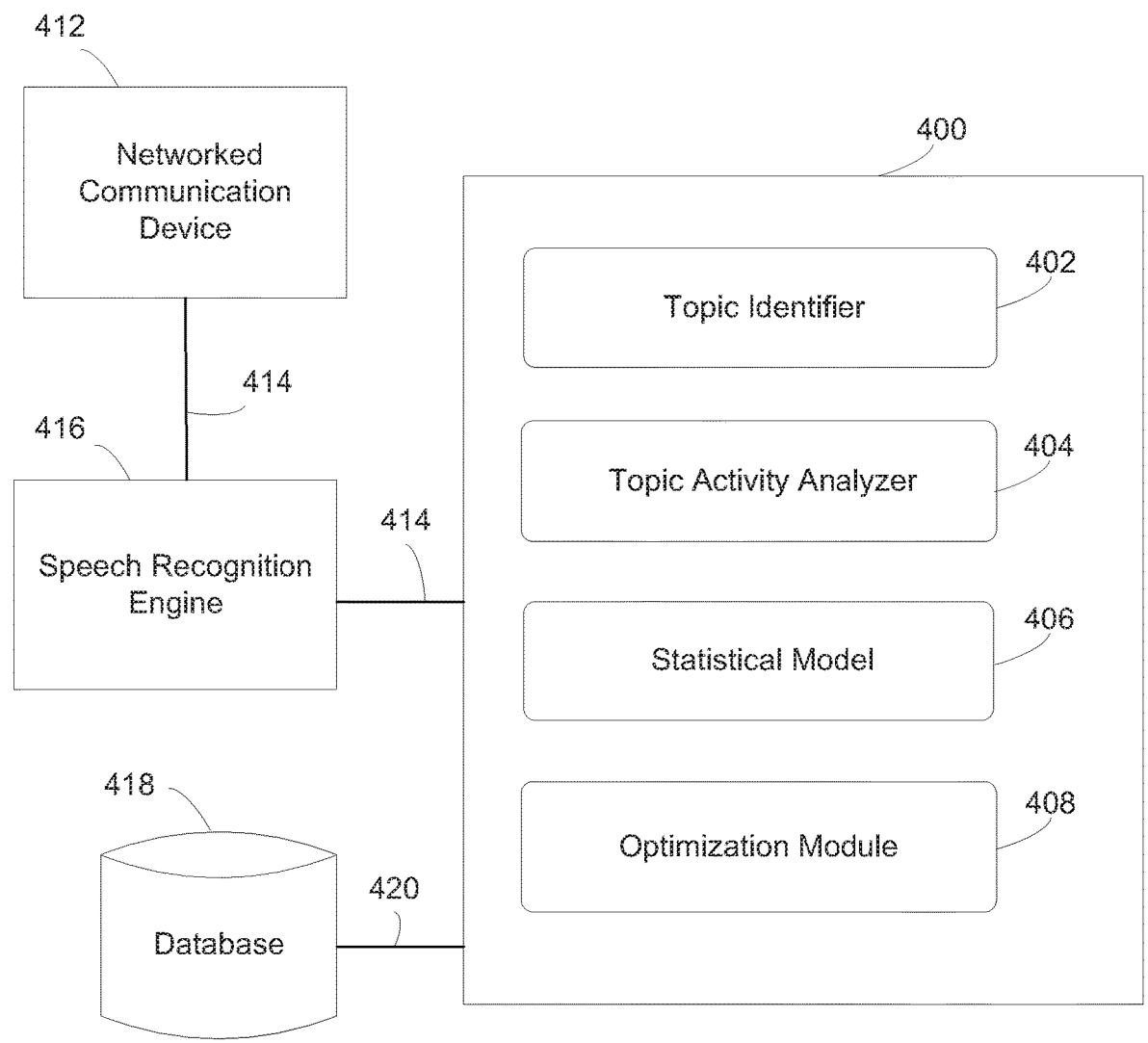
FIG. 4 depicts a system of conversational interchange optimization according to an embodiment of the present disclosure.

FIG. 4 depicts system 400, which according to one embodiment, is similar to system for conversational interchange optimization 96 described in reference to FIG. 2. System 400 illustratively includes topic identifier 402, topic activity analyzer 404, statistical model 406, and optimization module 408. In one embodiment, system 400 is implemented in computer system-executable instructions (e.g., one or more program modules) that are executable by a processor such as processor 316 of computer system 312 described in reference to FIG. 3. Accordingly, system 400 can be implemented, for example, in computer-system instructions executable on a server (e.g., cloud-based server) or other type of computer system. In other embodiments, one or more of topic identifier 402, topic activity analyzer 404, statistical model 406, and optimization module 408 can be implemented in hardwired circuitry or in a combination of circuitry and computer system-executable instructions.

System 400 can be integrated in a communication system, collaboration system, social network, or other networked system. System 400 can be communicatively coupled with more than one such system simultaneously. Operatively, system 400 determines and executes an optimal topic map navigation with an associated length of time for each topic to prevent the topic from approaching a threshold risk of sentiment shift in a conversation. System 400 keeps participants in a conversation interested and with an overall satisfaction. The participants can conduct the conversation using communication devices (only one of which, communication device 412, is explicitly shown) communicatively coupled via communications network 414. The conversation can occur through a series of written and/or verbal exchanges. System 400 operates on text and, accordingly, speech recognition engine 416 can be interposed between the system and networked communication devices. Communications network 414 can be implemented in, or include, one or any combination of communication technologies such as a local area network (LAN), wide area network (WAN), wireless network (e.g., wireless WAN and/or wireless LAN), mobile or cellular network, virtual private network (VPN), public switched telephone network (PSTN), or the Internet. Networked communication devices can communicatively couple to communications network 414 via wired and/or wireless communication links and can comprise computer systems (e.g., servers, personal computers, portable computers, tablets), mobile devices such as smart phones, telephones such as voice-over IP (VoIP) phones, or other types of communication device. Such devices can be used to establish audio, video, audiovisual, or other types of communication sessions through communications network 414. Non-written communications are converted to text by speech recognition engine 416, as noted above.

Figure 5:
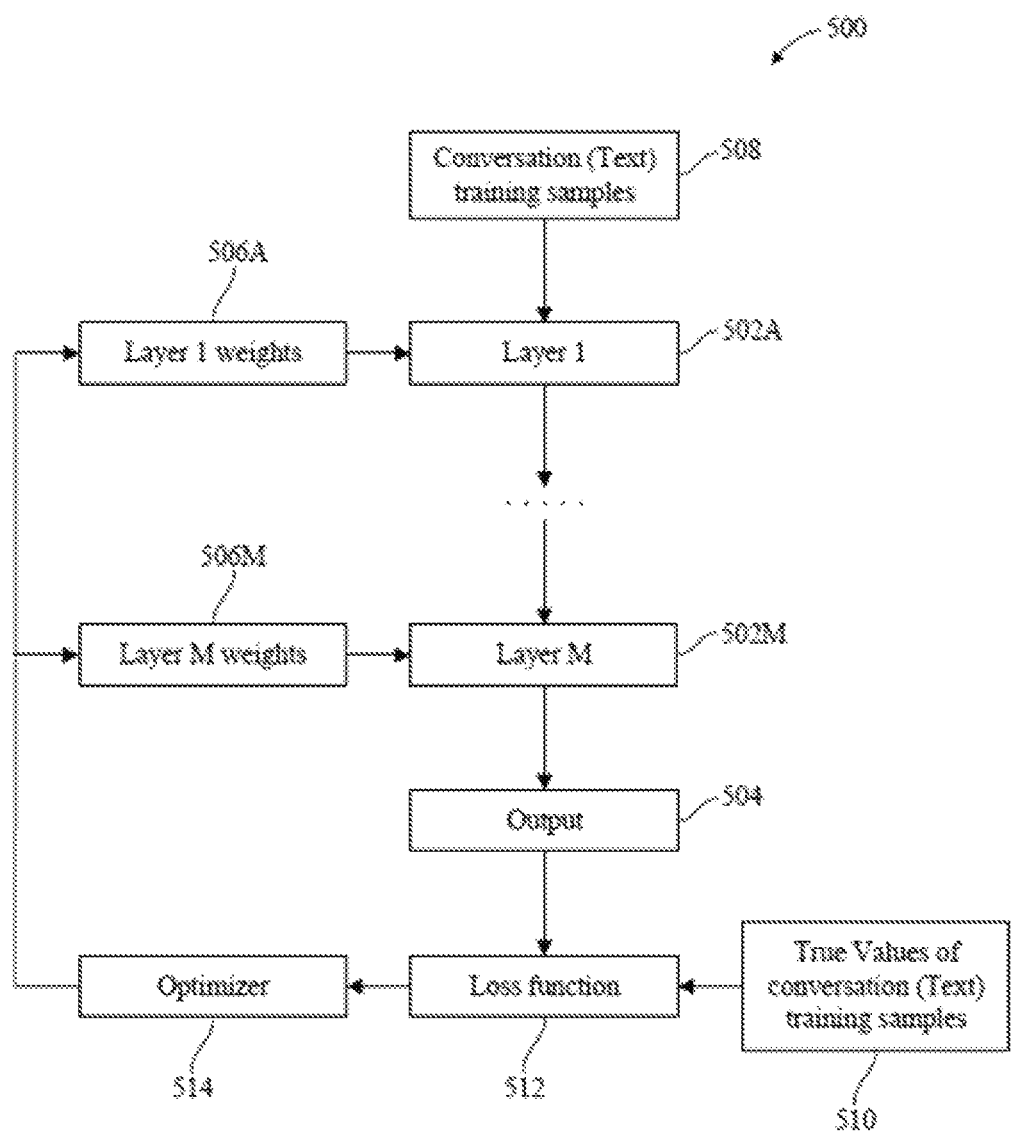
FIG. 5 depicts a deep learning neural network used in a system of conversational interchange optimization according to an embodiment of the present disclosure.

In one or more embodiments, system 400 monitors the conversations in communication systems, for example, from meeting minutes, connection activities, emails, and social media posts. System 400 may generate a list of topics in the conversations. Conversation topics may be determined by topic identifier 402 using neural network techniques. Topic identifier 402 can be implemented with machine learning. In one embodiment, topic identifier 402 comprises a deep learning neural network that learns to classify conversation text (including textual renderings of verbal conversations) into one of N categories, each category corresponding to a predetermined topic. Text generated from prior conversations and archived in database 418 and can be used to train the neural network. Referring additionally to FIG. 5, neural network 500 for determining conversation topics is illustratively a deep learning neural network that comprises a directed, acyclic graph of layers (text processing modules or filters) 502A through 502M that are sequentially chained together. Output 504 generated by neural network 500 is based on input that feeds through layers 502A through 502M, each layer modifying the output of a preceding layer based on a set of parameters or weights 506A through 506M. The weights (kernel and bias attributes) are trained (iteratively refined) using training samples of conversations (text) 508 fed into the neural network. The output generated is compared with true values 510 of the training samples of conversations (text) 508. The difference between the generated values and true values 510 for classifying the training samples of conversations (text) 508 is measured by a loss calculated by loss function 512. In one embodiment, loss function 512 is the categorical cross-entropy criterion. In a feedback fashion, optimizer 514 adjusts weights 506A through 506M over successive iterations using the backpropagation algorithm. The backpropagation algorithm iteratively adjusts weights 506A through 506M in directions that lower the loss calculated by loss function 512. The iterative refinement of weights 506A through 506M continues until an acceptable level of accuracy is achieved in classifying a separate test set of samples of text of conversations.

Input to neural network 500 is initially in the form of text (including textual renderings of verbal conversations) and is therefore transformed into numerical tensors (multidimensional algebraic objects analogous to one-dimensional vectors) by breaking the text (e.g., words, characters, n-grams) into tokens and associating numeric vectors with each. Any technique such as categorical encoding (one-hot encoding) or word embedding can be used to transform text into numerical tensors. For each text so transformed, neural network 500 outputs an N-tuple, each of whose elements is a probability (between zero and one) that the conversation embodied in the text belongs to the corresponding one of the N categories. The conversation (text) is classified as belonging to the topic category for which the probability is greatest. Responsive to classifying newly presented text corresponding to a current conversation, neural network 500 determines the current topic of conversation. As a conversation proceeds, new text is generated and neural network 500 can determine from the generated text whether a new topic is introduced into the current conversation.

Referring still to FIG. 4, topic activity analyzer 404 determines a flow for each topic based on length of time, number of participants, and sentiment associated to each topic. For example, topic activity analyzer 404 may analyze topic activities and interactions over a time frame to identify the length of time that the topic lasts and the number of participants in conversations for the topic. Topic activity analyzer 404 may determine the flow for a topic using prioritized objectives for time, cost and sentiment. Topic activity analyzer 404 may determine the flow using neural network techniques as described in FIG. 5. An interaction is a kind of action that occur as two or more participants have an effect upon one another. Examples of interactions may include communication of any sort, for example two or more people talking to each other, or communication among groups, organizations, nations or states. These interactions can contain various levels of sentiment. Sentiment can be positive, such as happiness, satisfaction, contentment, amusement, or other positive feelings of the speaker, or negative, such as anger, disappointment, resentment, irritation, or other negative feelings. In another example, the determination of topics may be made based on prior conversations archived in database 418, which illustratively is coupled communicatively to system 400 via communication link 420. Topic activity analyzer 404 analyzes archived conversations selected based on the topic classification of the conversations using any of various statistical methodologies. For example, assuming that conversation times exhibit a Gaussian or normal distribution, topic activity analyzer 404 can determine a mean and standard deviation of the prior conversations pertaining to a given topic and, based on the determined mean, topic activity analyzer 404 can provide the expected time, at a specific confidence level, that the conversation on the given topic will last.

Archived text can be stored in database 418 along with other data. The data can optionally include other conversation-specific data that can be used to refine time predictions. Conversation-specific data can include, for example, identities of participants in a prior conversation. Predicted times pertaining to a given topic of a current conversation can vary, based on analysis of prior conversations, depending on who the participants are. Conversation-specific data also can include, for example, sentiment determined by a sentiment or tone analyzer (not shown, but optionally part of system 400). The sentiment or tone analyzer can use linguistic analysis to detect sentiments such as joy, fear, sadness, anger, analytical, confident and tentative tones expressed in conversation text (or textual rendering of verbal communication). Predicted times pertaining to a given topic of the current conversation can vary depending on a particular sentiment of one or more of the participants. Metadata also can be stored in database 418 for determining a level of importance or urgency of the current conversation. Metadata can be used to refine system-based topic identification if there is residual uncertainty regarding a conversation topic. For example, in a conversation that references "widget," metadata can provide additional context to the reference, such that the context for "widget" is specific to conversation participants Alice and Bob rather than to participants Alice and Charles or participants Bob and Charles. Other conversation-specific data can be multipurpose Internet mail extension (MIME) data, such as tags and/or labels. Other conversation-specific data can include social media data pulled from a social media communication service. The data can be used to further identify specific topics of conversation.

Various schema can be used for indexing the data stored in database 418. Conversations (embodied in textual renderings), for example, can be archived based on assigned conversation identifiers ("IDs"). Conversations, in one embodiment, can be ordered in conversation timeseries comprising conversations that have the same unique conversation ID (or other "fingerprint") based, for example, on a check sum (e.g., SHA1/MD5). Thus, conversations that include both verbal and text-based communications, can be arranged in the proper sequence to generate a complete textual rendering of the conversation. Conversations embodied in written messages (e.g., text messages, email) can ignore reply-to or forwarded content so that content of the conversation is more clearly discernable. In one embodiment, a system user can pre-select among the available types of data stored in database 418 the specific data types used by topic activity analyzer 404 for determining an expected time that a conversation on a specific topic will last.

System 400 optionally incorporates a natural language processor (NLP) with the capability to identify word patterns that differ only in grammatical structure or style, but whose substantive content expresses the same or closely similar thoughts or sentiments. In one embodiment, the NLP analyzes the content of current and archived conversations (text) using a lemmatizer, a natural language processing technique that performs morphological analysis to identify the lemmas of distinct words in a conversation text. A lemma is the base or dictionary form of a word. For example, implementing a lemmatization, the NLP treats a word such as "saw" as either "see" or "saw" (as in, the tool) depending on whether the word is used in the document as a verb or a noun, which can be determined by the NLP using parts-of-speech tagging.

In another embodiment, the NLP uses a stemming procedure to reduce inflectional forms and derivationally related forms of words in the text of current and archived conversations. Stemming typically requires less information than lemmatizing (which relies on a vocabulary and morphological analysis to lemmatize words), but is a less refined, more heuristic process that identifies the roots of words by eliminating word endings or derivational affixes of the words. The NLP, in various embodiments, can implement different stemming algorithms, such as the Porter stemmer (which consists of five, sequentially applied phases of word reductions), Lovin stemmer, or Paice stemmer.

In one or more embodiments, statistical model 406 is built for each topic based on the flow to infer likely success of a topic progression for an incoming conversation. Statistical model 406 is combined with a transition matrix to infer likely success paths for the topic to proceed. The transition matrix is configured to use analysis of, for example, regression analysis, conditional probability, and completion probability. Probability is a measure quantifying the likelihood that events will occur. A regression analysis estimates a relationship between one or more explanatory variables and a single output binary variable. Generally, the probability of the two alternatives is modeled, instead of simply outputting a single value, as in linear regression. In a hypothetical scenario, when a simple regression analysis of a topic requires X interaction times and the topic is completed for Y times, the result probability would be Y/X. For example, when a topic requires 134 interactions and is completed 97 times with 134 interactions, the result probability equals to 97/134, i.e., 72.4%. Conditional probability is the probability of some event A, given the occurrence of some other event B. For example, Bayes' theorem describes the probability of an event, based on prior knowledge of conditions that might be related to the event.

In one or more embodiments, optimization module 408 may update a topic progression for an incoming conversation based on an inferred success or failure from statistical model 406. Optimization module 408 may act to add or remove a participant from the incoming conversation. Optimization module 408 may update a schedule for the incoming conversation. Optimization module 408 may optionally generate a visualized map identifying interactions needed and the expected results of interactions for the incoming conversation. A visual of the analysis is optionally created and surfaced graphically to determine the completion of topics and interactions.

In an example, optimization module 408 may generate an automatic change (e.g. users to interact with specific topics with a specific time) for the communication system that conversations are involved with. The change may include scheduling systems (such as meeting agendas), real-time collaboration platforms (such as instant messaging) and even extending to audio real-time systems. There are degrees of nuance where a participant will have to follow a particular path of the time. If the collaboration has a likelihood of being sub-optimal, optimization module 408 may rotate in different paths to ascertain optimal topic paths. The proximate factors that contribute to a participant optimally interacting may be tested from the perspective of other users and groups. In a hypothetical scenario, if participant A navigates optimally from topic A to topic B when participant B is also present in a conversation, participant A can be notified of this factor before committing to the conversation.

As described above, topic identifier 402 determines at the start of a current conversation a topic or topics of the conversation and, based on the analysis by topic activity analyzer 404 of prior conversation pertaining to the same or similar topics, a likely time for concluding the current conversation. With system 400 communicatively coupled to the scheduling system, system 400 can analyze scheduled events to determine whether any scheduled events relate to a conversation over a communication network to which system 400 also can be communicatively coupled. System 400 can identify a topic or topics of the conversation and the corresponding expected length of the conversation based on data provided through the user's scheduling system.

Figure 6:
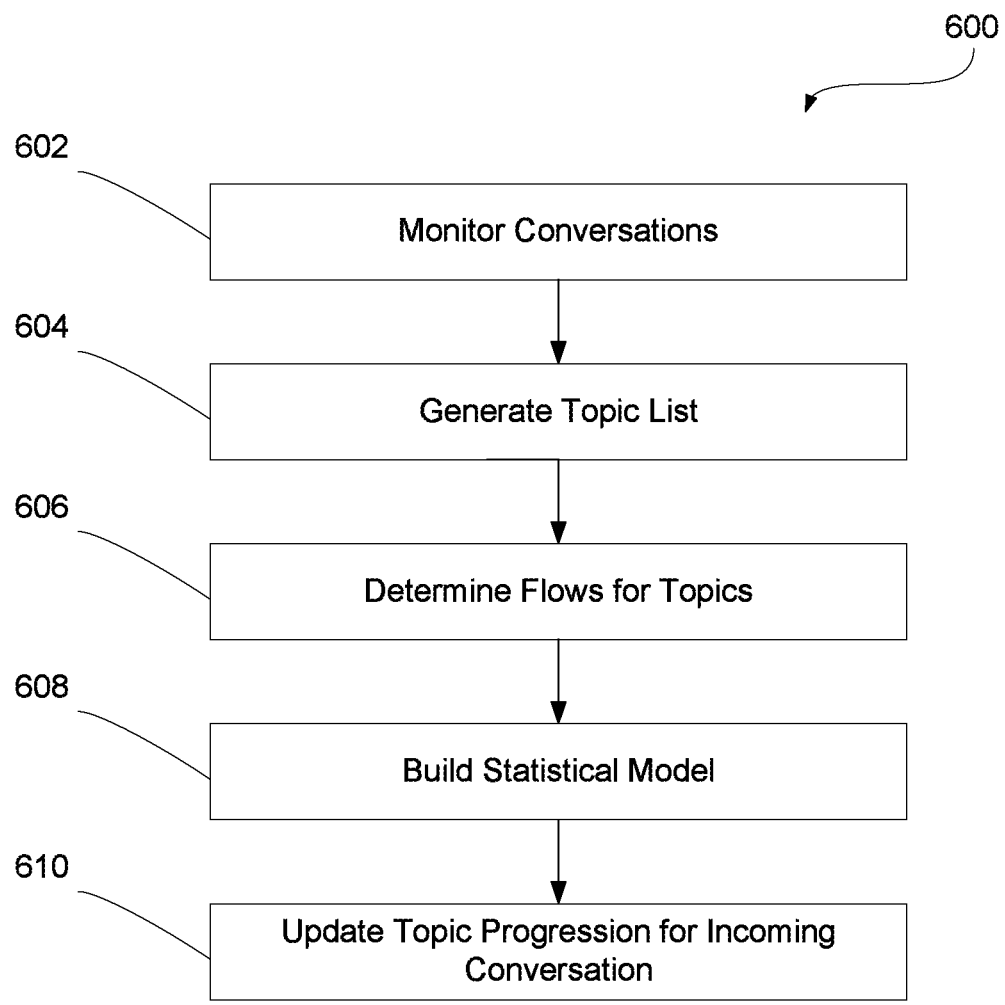
FIG. 6 is a flowchart of a method for conversational interchange optimization according to an embodiment of the present disclosure.

FIG. 6 is a flowchart of method 600 of conversational interchange optimization, according to one embodiment. Method 600 can be performed by a system the same as or similar to the systems described in reference to FIGS. 1-5. The system at block 602 monitors the conversations in a communication system, including, for example, meeting minutes, connection activities, emails, and social media posts. At block 604 the system may identify topics associated with the conversations in the communication system. The system may generate a list of the topics associated with the conversations by, for example, using a frequency matching to ascertain a hit. The system may analyze the topic activities and interactions over a certain time frame.

At block 606 the system determines a flow for each topic based on length of time, number of participants, and sentiment associated to each topic in the list of topics of the conversations. The flow is the progress of interactions and shifts for each topic. For example, the system may analyze topic activities and interactions over a time frame to identify the length of time that the topic lasts and the number of participants in conversations for the topic. The system may determine the flow for a topic using prioritized objectives for time, cost and sentiment. Interaction is a kind of action that occur as two or more participants have an effect upon one another. Examples of interactions may include communication of any sort, for example two or more people talking to each other, or communication among groups, organizations, nations or states. These interactions can contain various levels of sentiment. Sentiment can be positive, such as happiness, satisfaction, contentment, amusement, or other positive feelings of the speaker, or negative, such as anger, disappointment, resentment, irritation, or other negative feelings.

At block 608 the system builds a statistical model for each topic, based on the flow, to predict success or failure of a topic progression for an incoming conversation. The statistical model may be combined with a transition matrix to predict likely success paths for the topic to proceed. The transition matrix may be configured to use analysis techniques such as regression analysis, conditional probability, and completion probability. Probability is a measure quantifying the likelihood that events will occur. A regression analysis estimates a relationship between one or more explanatory variables and a single output binary variable. Generally, the probability of the two alternatives is modeled, instead of simply outputting a single value, as in linear regression.

At block 610 the system updates a topic progression for an incoming conversation based on a predicted success or failure from the statistical model. The system may act to add or remove a participant from the incoming conversation. For example, the system may add participant C when participant C is determined to be necessary to the incoming conversation because participant A would depend on participant C to smooth the incoming conversation for topic shifts in the conversation. The system may remove a participant from the incoming conversation when the participant is determined to be unnecessary and negatively impact the flow of the incoming conversation. The system may update a schedule for the incoming conversation with the participant changes. The system may optionally generate a visualized map identifying what interactions are needed and what the expected results of interactions are for the incoming conversation. A visual of the analysis is optionally created and surfaced graphically to determine the completion of topics and interactions. In an embodiment, the system may generate an automatic change (e.g. users to interact with specific topics with a specific time) for the communication system that conversations are involved with. The change may be a change in scheduling systems (such as meeting agendas), real-time collaboration platforms (such as instant messaging) and even audio real-time systems.

The terminology used herein is for the purpose of describing particular embodiments only and is not intended to be limiting. Notwithstanding, several definitions that apply throughout this document now will be presented.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human interaction or intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the terms "if," "when," and "upon" mean "in response to" or "responsive to," depending upon the context. Thus, for example, the phrases "if it is determined" and "if [a stated condition or event] is detected" are to be construed to mean "in response to determining" or "responsive to determining" and "in response to detecting [the stated condition or event]" or "responsive to detecting [the stated condition or event]," depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the phrases "responsive to" and "in response to" mean responding or reacting readily to an action or event. Thus, if a second action is performed "responsive to" or "in response to" a first action, there is a causal relationship between an occurrence of the first action and an occurrence of the second action. The phrases "responsive to" and "in response to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the terms "host," participant," and "user" mean a human being and "participants" means multiple human beings.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    monitoring, by one or more processors, a conversation in a communication system;
    generating, by one or more processors, a list of topics in the conversation based on an identification of a plurality of predetermined topics and an expected conversation length of time for each topic of the predetermined topics from data provided by a scheduling system, wherein the expected conversation length of time for a respective topic is based on a mean and standard deviation of time of one or more prior conversations pertaining to the respective topic;
    determining, by one or more processors, a flow for each topic based on the expected conversation length of time for the respective topic, number of participants, and sentiment associated to each topic, the flow being the progress of interactions and shifts for each topic;
    building, by one or more processors, a statistical model for each topic based on the flow indicating predicted success of a topic progression for an ongoing conversation; and
    updating, by one or more processors, the topic progression for the ongoing conversation based on the predicted success.

2. The computer-implemented method of claim 1, further comprising:
    generating, by one or more processors, a visualized map identifying what interactions are expected for the ongoing conversation.

3. The computer-implemented method of claim 1, wherein the statistical model is combined with a transition matrix to predict likely success paths for the topic to proceed.

4. The computer-implemented method of claim 3, wherein the transition matrix is configured to use one or more analysis techniques selected from group consisting of: regression analysis, conditional probability, and completion probability.

5. The computer-implemented method of claim 1, wherein updating the topic progression for the ongoing conversation includes removing, by one or more processors, a participant from the ongoing conversation based on a determination that the participant is unnecessary and negatively impacting flow from the ongoing conversation, wherein the conversation comprises an exchange between a plurality of users.

6. The computer-implemented method of claim 1, wherein updating the topic progression for the ongoing conversation includes changing, by one or more processors, a meeting agenda of a schedule for the ongoing conversation.

7. The computer-implemented method of claim 1, further comprising:
    identifying, by one or more processors, the topics in the conversations using neural network techniques.

8. A computer program product comprising:
one or more computer readable storage media, and program instructions collectively stored on the one or more computer readable storage media, the program instructions comprising:
program instructions to monitor a conversation in a communication system;
program instructions to generate a list of topics in the conversation based on an identification of a plurality of predetermined topics and an expected conversation length of time for each topic of the predetermined topics from data provided by a scheduling system, wherein the expected conversation length of time for a respective topic is based on a mean and standard deviation of time of one or more prior conversations pertaining to the respective topic;
program instructions to determine a flow for each topic based on the expected conversation length of time for the respective topic, number of participants, and sentiment associated to each topic, the flow being the progress of interactions and shifts for each topic;
program instructions to build a statistical model for each topic based on the flow indicating predicted success of a topic progression for an ongoing conversation; and
program instructions to update the topic progression for the ongoing conversation based on the predicted success.

9. The computer program product of claim 8, further comprising:
program instructions, stored on the one or more computer-readable storage media, to generate a visualized map identifying what interactions are expected for the ongoing conversation.

10. The computer program product of claim 8, wherein the statistical model is combined with a transition matrix to predict likely success paths for the topic to proceed.

11. The computer program product of claim 10, wherein the transition matrix is configured to use one or more analysis techniques selected from group consisting of: regression analysis, conditional probability, and completion probability.

12. The computer program product of claim 8, wherein program instructions to update the topic progression include program instructions to remove a participant from the ongoing conversation based on a determination that the participant is unnecessary and negatively impacting flow from the ongoing conversation, wherein the conversation comprises an exchange between a plurality of users.

13. The computer program product of claim 8, wherein program instructions to update the topic progression include program instructions to change a meeting agenda of a schedule for the ongoing conversation.

14. The computer program product of claim 8, further comprising:
program instructions, stored on the one or more computer-readable storage media, to identify the topics in the conversations using neural network techniques.

15. A computer system comprising:
one or more computer processors, one or more computer readable storage media, and program instructions stored on the one or more computer readable storage media for execution by at least one of the one or more computer processors, the program instructions comprising:
program instructions to monitor a conversation in a communication system;
program instructions to generate a list of topics in the conversation based on an identification of a plurality of predetermined topics and an expected conversation length of time for each topic of the predetermined topics from data provided by a scheduling system, wherein the expected conversation length of time for a respective topic is based on a mean and standard deviation of time of one or more prior conversations pertaining to the respective topic;
program instructions to determine a flow for each topic based on the expected conversation length of time for the respective topic, number of participants, and sentiment associated to each topic, the flow being the progress of interactions and shifts for each topic;
program instructions to build a statistical model for each topic based on the flow indicating predicted success of a topic progression for an ongoing conversation; and
program instructions to update the topic progression for the ongoing conversation based on the predicted success.

16. The computer system of claim 15, further comprising:
program instructions, stored on the one or more computer-readable storage media, to generate a visualized map identifying what interactions are expected for the ongoing conversation.

17. The computer system of claim 15, wherein the statistical model is combined with a transition matrix to predict likely success paths for the topic to proceed.

18. The computer system of claim 17, wherein the transition matrix is configured to use one or more analysis techniques selected from group consisting of: regression analysis, conditional probability, and completion probability.

19. The computer system of claim 15, wherein program instructions to update the topic progression include program instructions to remove a participant from the ongoing conversation based on a determination that the participant is unnecessary and negatively impacting flow from the ongoing conversation, wherein the conversation comprises an exchange between a plurality of users.

20. The computer system of claim 15, wherein program instructions to update the topic progression include program instructions to change a meeting agenda of a schedule for the ongoing conversation.

* * * * *